United States Patent [19]

Prince

[11] Patent Number: 4,887,829
[45] Date of Patent: Dec. 19, 1989

[54] REAR WHEEL SUSPENSION SYSTEM FOR A TRICYCLE VEHICLE

[76] Inventor: Curtis L. Prince, 1256 Riverbreeze Blvd., Ormond Beach, Fla. 32074

[21] Appl. No.: 35,360

[22] Filed: Apr. 7, 1987

[51] Int. Cl.$^4$ ............................................. B62D 61/06
[52] U.S. Cl. .................................. 280/282; 280/112.2; 280/284; 180/215
[58] Field of Search .................... 180/215; 280/112 A, 280/111, 275, 282, 284, 285, 274

[56] References Cited

U.S. PATENT DOCUMENTS

| | | | |
|---|---|---|---|
| 3,606,374 | 9/1971 | Capgras | 280/112 A |
| 3,792,748 | 2/1974 | Regier | 280/112 A |
| 4,375,293 | 3/1983 | Solbes | 280/112 A |
| 4,478,305 | 10/1984 | Martin, II | 180/215 |

Primary Examiner—John J. Love
Assistant Examiner—Donn McGiehan

[57] ABSTRACT

A three wheeled vehicle having one front wheel and two rear wheels. The front wheel is for steering. Each rear wheel is rotatably mounted to a swing arm means. The two swing arms are pivotably mounted to the frame. The swing arms are connected to each other through a rocking arm assembly. The rocking arm is pivotably connected to the frame with a roll joint. The operator has the ability to lean the vehicle while negotiating curves. The vehicle can be kept upright while traversing a slope.

10 Claims, 4 Drawing Sheets

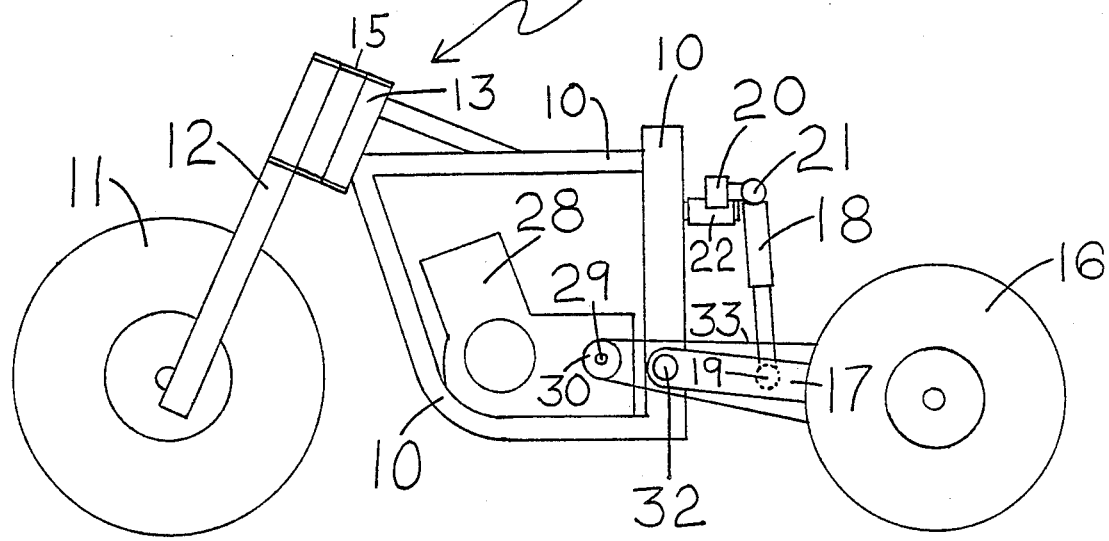

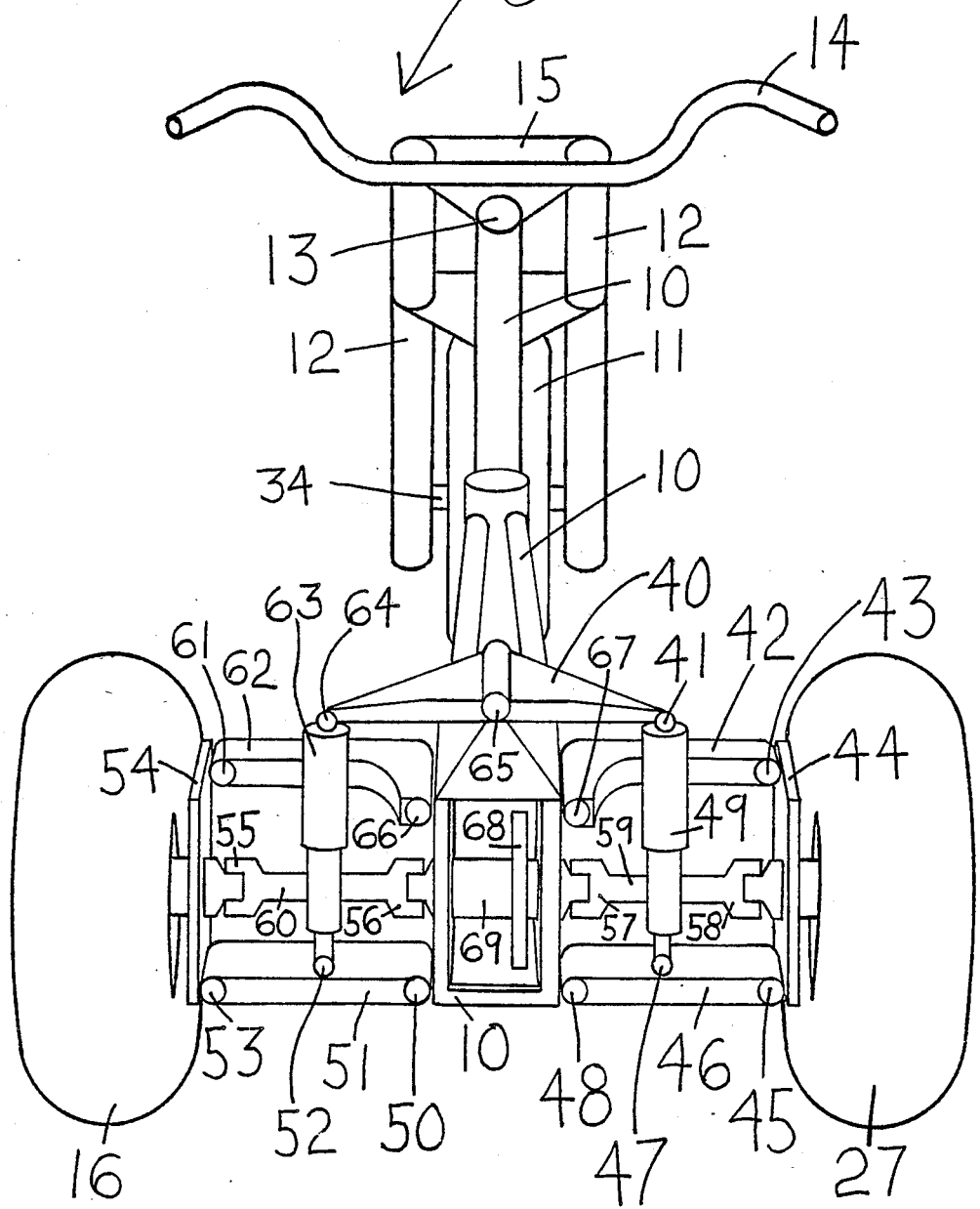

REAR WHEEL SUSPENSION SYSTEM FOR A TRICYCLE VEHICLE

BACKGROUND

The present invention relates to the chassis system of a three wheeled vehicle and more particularly to the suspension system of the rear wheels.

In recent years motorized three wheeled vehicles have become popular for off road riding. A much publicized problem with these vehicles is that they are dynamically unstable during operation. They tend to tip over while negotiating a curve. They tip over while traversing a slope. They tend to gyrate and roll over if an obstacle is encountered by one of the rear wheels. The operator must possess specialized skills and be very conservative in operation to prevent tipping over. The operating experience is unpleasurable and dangerous.

SUMMARY

The present invention effectively overcomes all the foregoing problems. It allows the operation to lean the vehicle into a curve much as a bicycle or motorcycle rider does. It also allows the operator to keep the vehicle upright while traversing a slope. It effectively prevents the vehicle from gyrating and rolling over when an obstacle is encountered by one of the rear wheels. The present invention can be operated very aggressively while maintaining full controll. It is pleasurable to operate and much safer.

Another advantage is that the rear wheels generate better traction. This is a result of the vehicle's ability to automatically distribute the weight equally between the rear walls.

A further advantage is that the vehicle provides a much smoother ride on rough terrain. This is a result of the vehicle's unique ability to allow the wheels to step over obstacles.

While negotiating a curve, the present invention utilizes centrifugal force and gravity to controll the attitude of the vehicle. Ballance is maintained by the operator through steering. Example: increasing the arc of the turn and decrease the centrifugal force. This will increase the angle of the lean. (Numerically decreased in degrees).

This vehicle also utilizes the angular momentum generated by the rotating mass of the front wheel as a gyro-stabilizer. This is also controlled by steering and compliments the changes in centrifugal force.

The operator also has the ability to shift his weight to effect the attitude of the vehicle.

BRIEF DESCRIPTION OF THE DRAWINGS

FIG. 2 shows the vehicle leaned to the right.

FIG. 3 is a left side view of the embodiment in FIG. 1. The right rear wheel is hidden.

FIG. 4 is a rear elevated perspective view of a second embodiment.

DETAILED DESCRIPTION OF THE DRAWINGS

Figure 1:
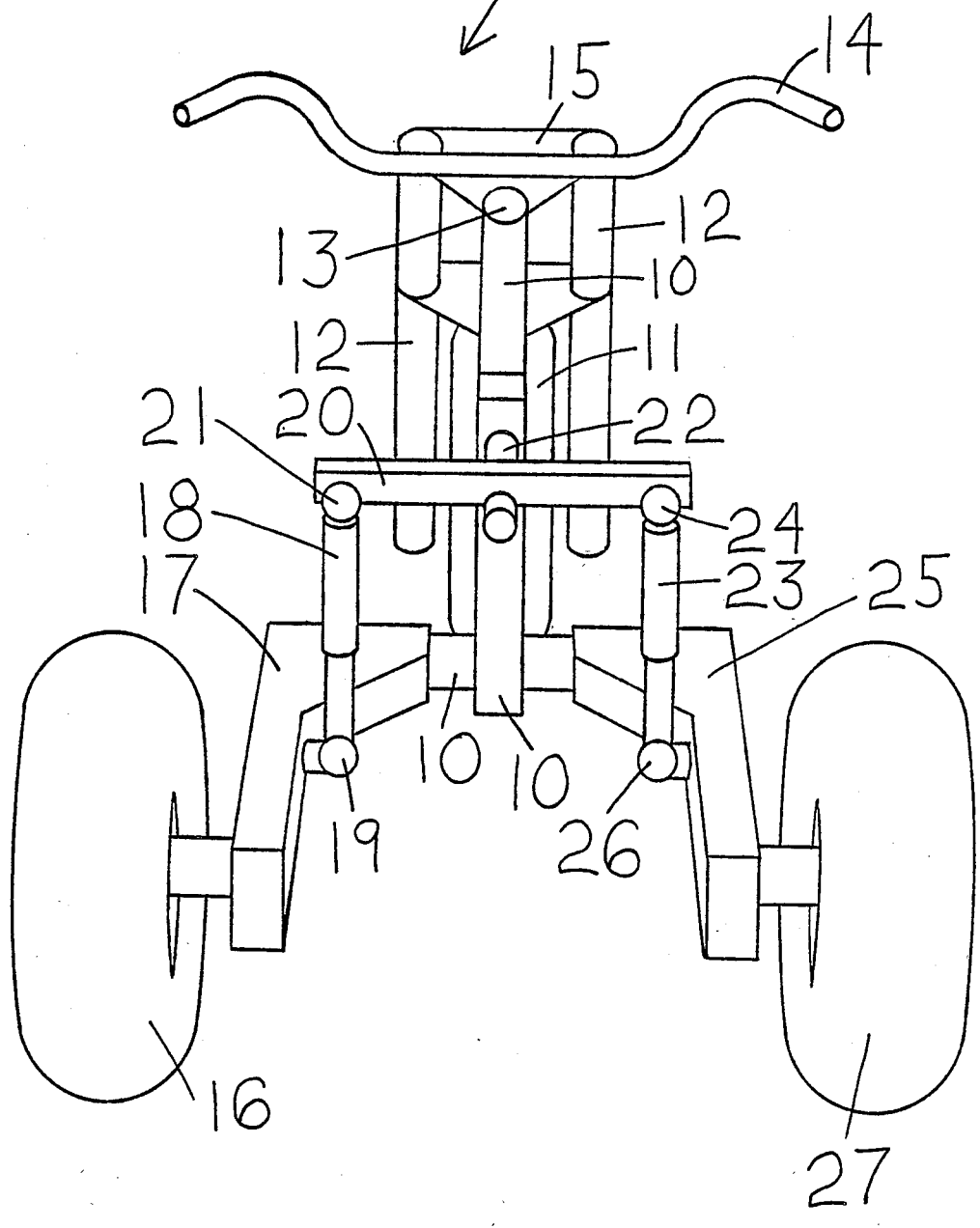
FIG. 1 is a rear elevated perspective view of one embodiment.

FIG. 1 shows a rear elevated perspective view of a three wheeled vehicle comprised of a frame 10, a front wheel 11, left rear wheel 16, and right rear wheel 27. This front wheel 11 is rotatably mounted to front forks 12. The forks are pivotably mounted to the frame 10 through mounting plate 15 and steering head 13. The handlebars 14 are fixed to the mounting plate 15.

FIG. 1 shows the left rear wheel 16 rotatably mounted to left swing arm 17. Left swing arm 17 is pivotably mounted to the frame 10. The left swing arm 17 is pivotably mounted to shock absorber 18 through ball joint 19. Shock absorber 18 is pivotably mounted to rocking arm 20 through ball joint 21. Rocking arm 20 is pivotably mounted to the frame 10 at roll joint 22. Rocking arm 20 is also pivotably connected to shock arbsorber 23 through ball joint 24. Shock absorber 23 is pivotably mounted to the right side swing arm 25 through ball joint 26. Swing arm 25 is pivotably mounted to frame 10. The right rear wheel 27 is rotatably mounted to right swing arm 25.

Figure 2:
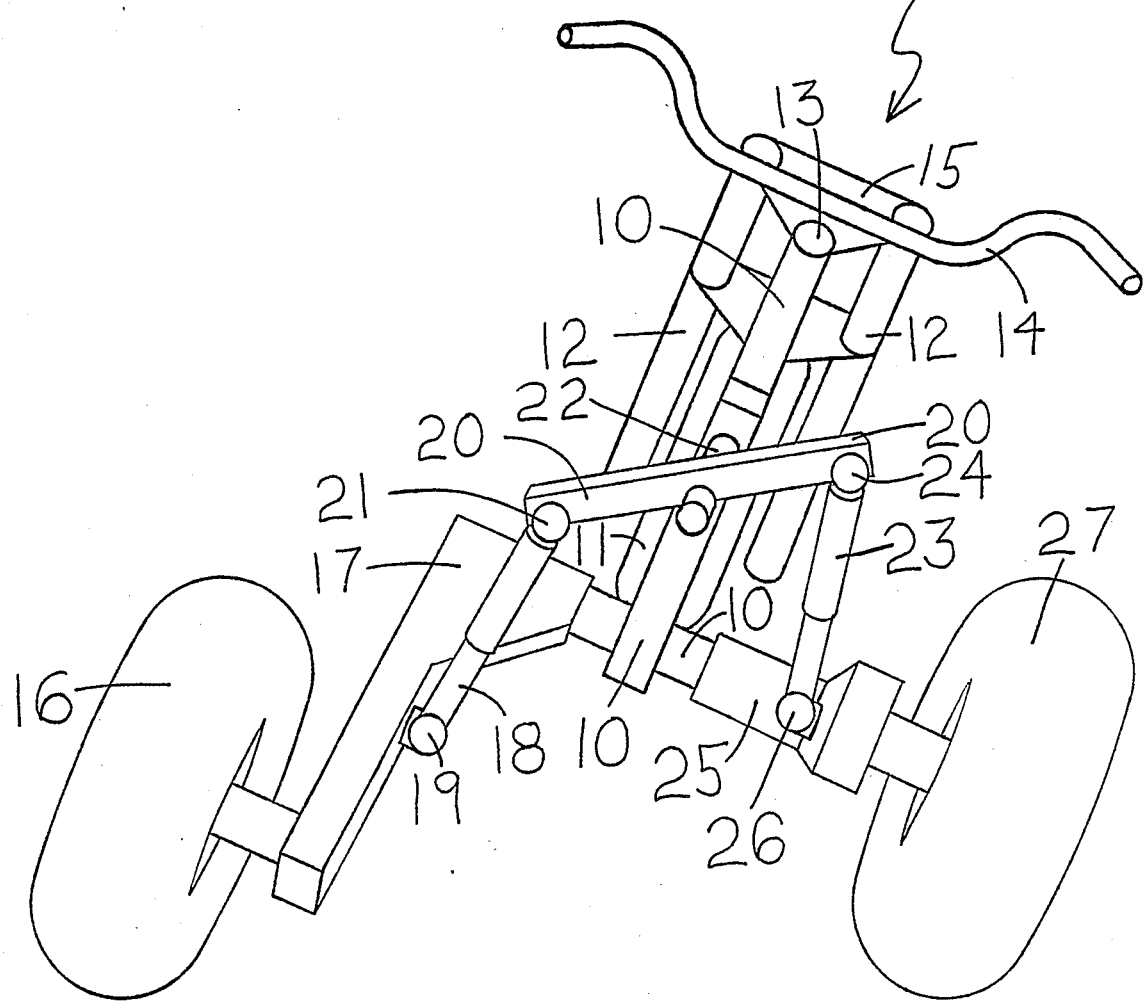
FIG. 2 is a rear elevated perspective view of the same embodiment in FIG. 1.

FIG. 2 shows a rear elevated perspective view of the same embodiment in FIG. 1. FIG. 2 shows the vehicle leaned to the right as it would in a right turn. It is comprised of a frame 10, front wheel 11, left rear wheel 16, and right rear wheel 27. The front wheel 11 is rotatably mounted to front forks 12. The forks are pivotably mounted to the frame 10 through mounting plate 145 and steering head 13. The handlebars 14 are fixed to the mounting plate 15.

FIG. 2 shows the left rear wheel 16 rotatably mounted to left swing arm 17. Left swing arm 17 is pivotably mounted to the frame 10. The left swing arm 17 is pivotably mounted to shock absorber 18 through ball joint 19. Shock absorber 18 is pivotably mounted to rocking arm 20 through ball joint 21. Rocking arm 20 is pivotably mounted to the frame 10 at roll joint 22. Rocking arm 20 is pivotably connected to shock absorber 23 through ball joint 24. Shock absorber 23 is pivotably mounted to right side swing arm 25 through ball joint 26. Swing arm 25 is pivotably mounted to frame 10. The right rear wheel 27 is rotatably mounted to right swing arm 25.

FIG. 3 is a left side view of the embodiment in FIGS. 1 and 2. FIG. 3 shows a motorized three wheel vehicle comprised of a frame 10, a front wheel 11, front forks 12, an engine 28, and left rear wheel 16. The right rear wheel is hidden. The front wheel 11 is rotatably mounted to the forks 12. The forks 12 are pivotably mounted to the frame 10 through steering head 13 and mounting plate 15. The left rear wheel 16 is rotatably mounted to the left swing arm 17. Left swing arm 17 is pivotably mounted to the frame 10 at pivot shaft 32. The left swing arm 17 is pivotably mounted to shock absorber 18 through ball joint 19. Shock absorber 18 is pivotably mounted to rocking arm 20 through ball joint 21. Rocking arm 20 is pivotably mounted to the frame 10 through roll joint 22. The right side shock absorber, right side swing arm, and the right rear wheel are hidden. FIG. 3 shows an engine 28 fixed to frame 10, an output shaft 29, a drive sprocket 30, and a drive chain 33.

FIG. 4 shows a rear elevated perspective view of a second embodiment. The vehicle is comprised of a front wheel 11, left rear wheel 16, and right rear wheel 27. The front wheel 11 is rotatably mounted to front forks 12 through axle 34. The front forks 12 are pivotably mounted to the frame 10 through mounting plate 15 and steering head 13. The handlebars 14 are fixed to the mounting plate 15.

FIG. 4 shows the left rear wheel 16 rotatably mounted to plate 54. Plate 54 is pivotably mounted to arm 62 at rolling joint 61. Arm 62 is also pivotably mounted to the frame 10 at rolling joint 66. Arm 51 is pivotably mounted to plate 54 at rolling joint 53. Arm 51 is also pivotably mounted to the frame 10 at rolling joint 50. Shock absorber 63 is pivotably mounted to arm 51 at joint 52. Shock absorber 63 is pivotably mounted to rocking arm 40 at joing 64. Rocking arm 40 is pivotably mounted to the frame 10 at rolling joint 65. Shock absorber 49 is pivotably mounted to the rocking arm 40 at joint 41. Shock absorber 49 is also pivotably mounted to arm 46 at joint 47. Arm 46 is pivotably mounted to the frame 10 at rolling joint 48. Arm 46 is also pivotably mounted to plate 44 at rolling joint 45. Arm 42 is pivotably mounted to the frame 10 at rolling joint 67. Arm 42 is also pivotably mounted to plate 44 at rolling joint 43. Wheel 27 is rotatably mounted to plate 44.

In this embodiment the left side swing arm is constructed with a quadrilateral of members comprised of plate 54, arm 62, arm 51 and frame 10. The right side swing arm is also a quadrilateral constructed of plate 44, arm 42, arm 46, and frame 10.

Universal joints 55, 56, 57, and 58 with shafts 59, 60, and 69 along with gear 68 constitute the axle assembly. The axle assembly rotates with the wheels 16 and 27.

What is claimed is:

1. A three wheeled vehicle having a frame, a front wheel, a pair of rear wheels, means for suspending said rear wheels from the frame comprising:
   a left swing arm comprised of:
      a upper arm pivotally mounted to the frame on a fixed axis and extending outward from the left side of the frame, a lower arm pivotally mounted to the frame on a fixed axis and extending outward from the left side of the frame substantially parallel to said upper arm, a wheel mounting plate pivotally mounted to said upper and lower arms at their outer ends such that the frame portion between the arms; the arms; and the wheel mounting plate from a quadrilateral,
   a wheel rotatably mounted to the wheel mounting plate of the left side swing arm,
   a right side swing arm comprised of:
      a upper arm pivotally mounted to the frame on a fixed axis and extending outward from the right side of the frame, a lower arm pivotally mounted to the frame on a fixed axis and extending outward from the right side of the frame substantially parallel to said upper arm, a wheel mounting plate pivotally mounted to said upper and lower arms at their outer ends such that the frame portion between the arms; the arms; and the wheel mounting plate form a quadrilateral,
   a wheel rotatably mounted to the wheel mounting plate of the right side swing arm,
   a rocker arm pivotally mounted to the frame and disposed above said left and right swing arms,
   a left linkage member pivotally mounted at its top to the rocker arm and pivotally mounted at its bottom to the left side swing arm,
   a right linkage member pivotally mounted at its top to the rocker arm and pivotally mounted at its bottom to the right side swing arm.

2. A device as claimed in claim 1 where at least one linkage members are resilient.

3. A device as claimed in claim 1 where at least one linkage members are shock absorbers.

4. A device as claimed in claim 1 that includes a power transfer shaft as part of the left swing arm, and a power transfer shaft is part of the right swing arm.

5. A three wheel vehicle having a frame, a front wheel, means for steering said front wheel, a pair of rear wheels, means for suspending said rear wheels from the frame comprising:
   a left side swing arm pivotally mounted to the frame on a substantially transverse axis such that said axis is located in the rearward 70% of the vehicle's overall length, a right side swing arm pivotally mounted to the frame on a substantially transverse axis such that said axis is located in the rearward 70% of the vehicle's overall length, one of said rear wheels rotatably mounted to the left side swing arm, one of said rear wheels rotatably mounted to the right side swing arm, linkage means operatively connecting said swing arms to each other and to said frame such that an upward force on one swing arm is transfered to a downward force on the other swing arm mechanically independent of said steering means.

6. A device as claimed in claim 5, where the linkage means operatively connecting said swing arms to each other and to said frame is resilient.

7. A three wheel vehicle having a frame, a front wheel, means for steering said front wheel, a pair of rear wheels suspended from the frame comprising:
   a left side swing arm pivotally mounted to the frame on a substantially transverse axis and extending rearward such that the axis is located in the rearward 70% of the vehicle's overall length, a right side swing arm pivotally mounted to the frame on a substantially transverse axis and extending rearward such that said axis is located in the rearward 70% of the vehicle's overall length, one of said rear wheels rotatably mounted to the left side of swing arm, one of said rear wheels rotatably mounted to the right side swing arm, a rocking arm assembly pivotally mounted to the frame independent of said steering means, means linking the rocking arm assembly to the left side swing arm, means linking the rocking arm assembly to the right side swing arm.

8. A device as claimed in claim 7 where at least one of the means linking the rocking arm assembly to its swing arm is resilient.

9. A device as claimed in claim 7 where at least one of the means linking the rocking arm assembly to its swing arm is a shock absorber.

10. A three wheel vehicle having a frame, a front wheel, means for steering said front wheel, a pair of laterally spaced rearwheels, an engine with an output shaft mounted to the frame near the vehicles center of gravity, means connecting the output shaft to at least one rear wheel, means for suspending said rear wheels from the frame comprising:
    a pair of laterally spaced swing arms mounted to the frame on substantially transverse axes and extending rearward behind said engine, one of said rear wheels rotatably mounted to each swing arm near their rearward ends, a rocking arm pivotally mounted at its center to the frame and disposed above said swing arms, a shock absorber with ball joint ends connecting the left side swing arm to the left side of the rocking arm, a second shock absorber with ball joint ends connect the right side of the rocker arm to the right side swing arm.

* * * * *